Oct. 7, 1952 — E. A. DE BRUYNE — 2,612,780
RESISTANCE THERMOMETER
Filed July 19, 1947 — 3 Sheets-Sheet 1
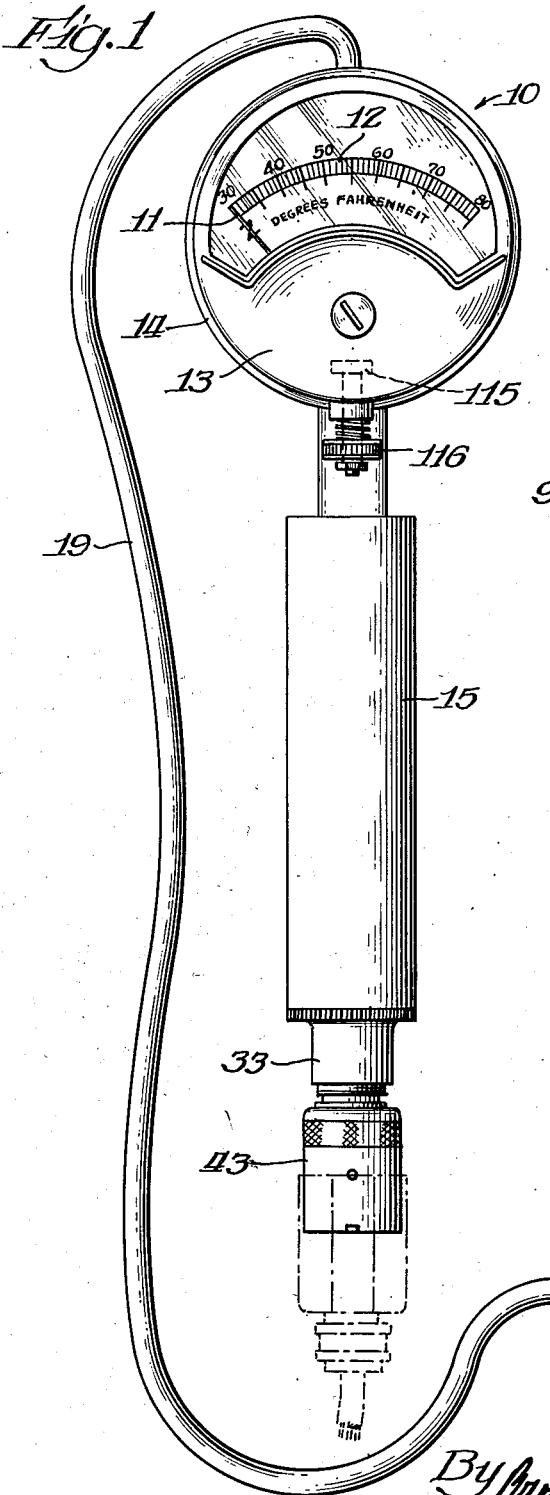
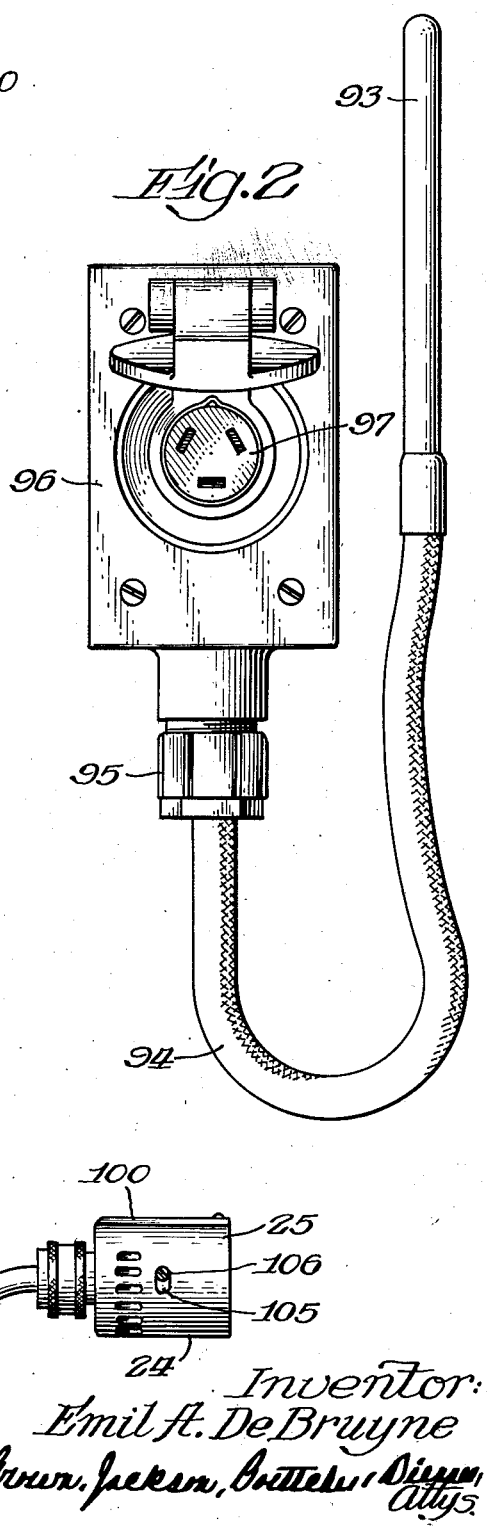
Inventor:
Emil A. De Bruyne
By Brown, Jackson, Boettcher & Dienner
Attys.

Oct. 7, 1952 — E. A. DE BRUYNE — 2,612,780
RESISTANCE THERMOMETER
Filed July 19, 1947 — 3 Sheets-Sheet 2
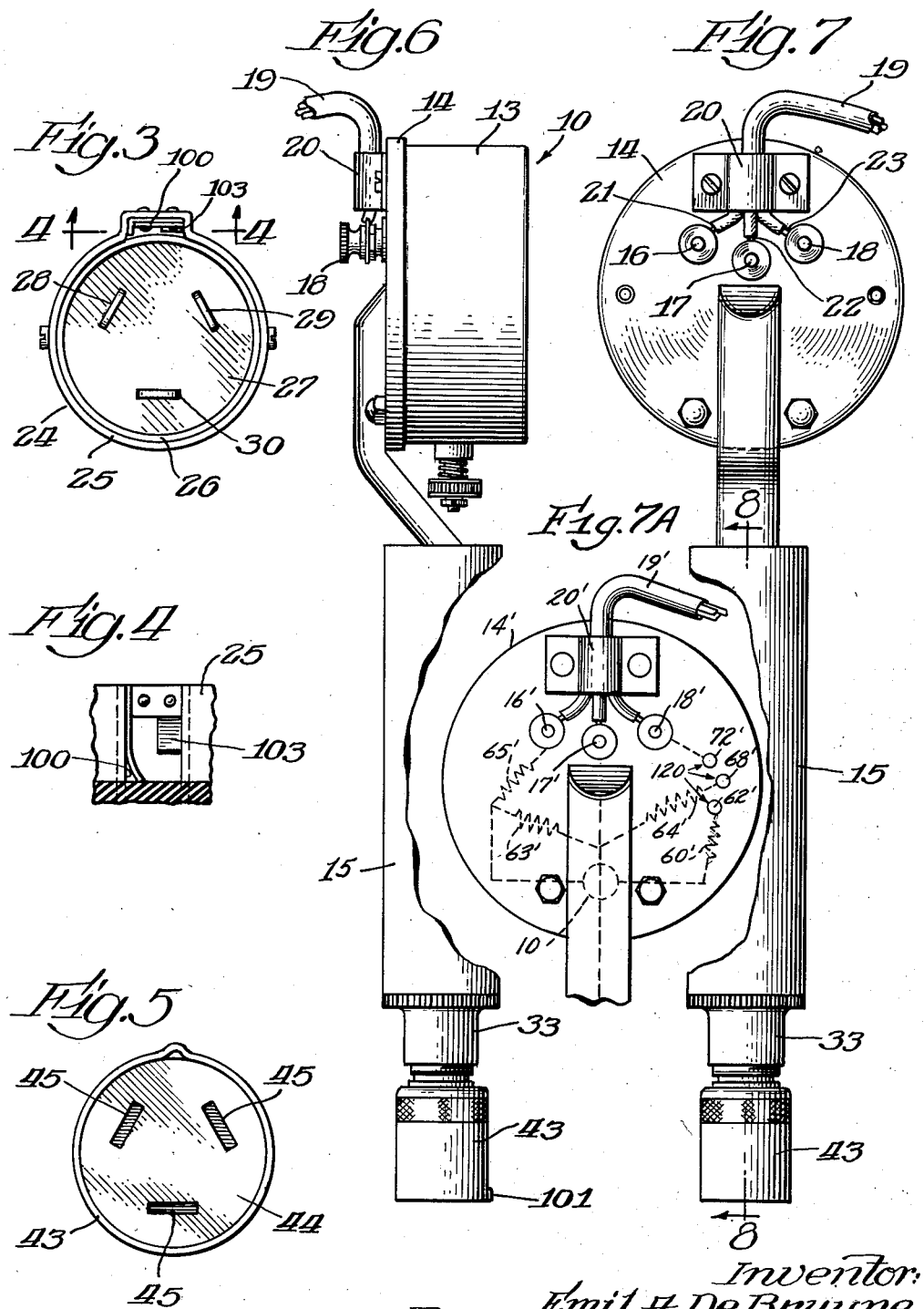
Inventor:
Emil A. De Bruyne Oct. 7, 1952 — E. A. DE BRUYNE — 2,612,780
RESISTANCE THERMOMETER
Filed July 19, 1947 — 3 Sheets-Sheet 3
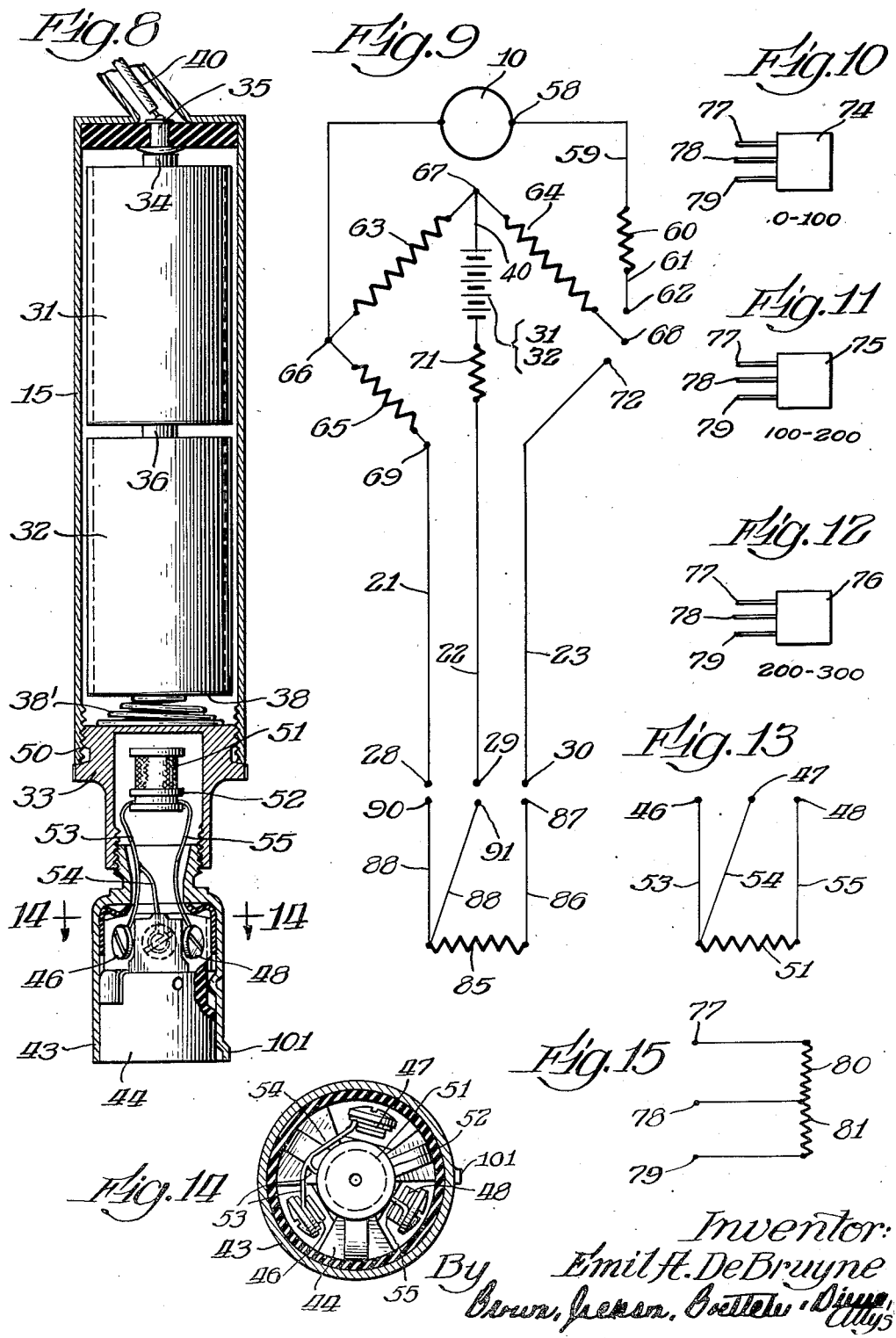
Inventor: Emil A. DeBruyne Patented Oct. 7, 1952

2,612,780

UNITED STATES PATENT OFFICE 2,612,780

RESISTANCE THERMOMETER

Emil A. De Bruyne, Elmwood Park, Ill., assignor to Illinois Testing Laboratories, Inc., Chicago, Ill., a corporation of Illinois Application July 19, 1947, Serial No. 762,070

5 Claims. (Cl. 73—362)

This invention relates, in general, to the art of measuring temperatures, and has particular relation to an improved resistance thermometer.

While the particular instrument which I shall describe hereinafter in connection with the drawings is a portable resistance thermometer adapted for use in testing or measuring temperatures at a plurality of stations or points, for example in different rooms or spaces, inside or outside, or in different cars or trucks—such as refrigerated cars or trucks—or cars or trucks for food or other products, and in testing or measuring the operating temperatures of water, oil, air and/or exhaust gases of diesel engines or automotive engines; also for testing or measuring the temperature of any compartment or space where a reading is desired without opening the door or entering such compartment, it is to be understood that the instrument of the present invention is not limited to such uses but may be employed in all similar work as suitable or desired.

Prior devices of the class described have usually been provided with an indicator of selected size and desired scale range, a temperature responsive element or thermobulb for each point or place of which a temperature reading is desired, dry batteries to furnish the operating current, triple wire connections extending from the indicator to each temperature responsive element, and a selector switch mechanism for selectively connecting the indicator to the respective temperature responsive elements; also a fixed resistance, not temperature responsive, with means for switching this resistance into and out of circuit with the indicator for test purposes as known in the art.

As a result of provisions such as those mentioned above, prior resistance thermometer systems have been costly and complicated, and where portability is desired the instruments have, in addition, been large and heavy. The wiring has been complicated and, irrespective of whether the instrument is of the portable type or the system is fixed, the switches or station selectors have been large, complicated and expensive, and the other features have presented limitations to more widespread adoption of such instruments than has occurred.

One of the main objects of the present invention is to provide an improved form of portable resistance thermometer in which problems previously presented are overcome.

Another object of the invention is to provide a portable resistance thermometer having various features of novelty and advantages, and which is particularly characterized by its simplicity in construction, its economy in manufacture, its light weight and small size for convenient portability and use, and its effectiveness in use for the intended purposes.

Another object of the invention is the provision of an improved resistance thermometer of the class described which is adapted to indicate accurately all of the various temperatures which the instrument is adapted to measure.

Another object of the invention is the provision of an improved instrument of the class described for measuring temperatures at a plurality of points or stations without selector switch mechanism or the like for selectively connecting the indicator of the instrument to the various temperature responsive elements.

Another object of the invention is the provision of an improved instrument of the class described for measuring temperatures at a plurality of points or stations without complicated and costly wiring, particularly without triple wire connections from the indicator to each of the temperature responsive elements.

Another object of the invention is the provision of an instrument of the class described that may be employed, for example for testing or measuring the temperature of any compartment or space where a reading is desired without opening the door or entering such compartment; also without complicated and expensive temperature measuring installations and instruments for such compartments or spaces.

Further objects and advantages of the invention will appear from the following detailed description, taken in connection with the accompanying drawings which illustrate the manner of constructing and using an illustrative embodiment of the invention.

In the drawings:

Figure 1 is a front elevational view of a resistance thermometer embodying the present invention, showing the lead conductor and a quick detachable terminal connection forming a part of the instrument;

Figure 2 is an elevational view of one form of temperature responsive element or thermobulb for use with the instrument shown in Figure 1, showing one form of connector device adapted for connecting the lead conductor of the temperature responsive element with the lead conductor of the instrument;

Figure 3 is an end view of the terminal connector at the end of the lead conductor shown in Figure 1;

Figure 4 is a fragmentary detail section taken on the line 4—4 of Figure 3;

Figure 5 is an end view of the terminal connector at one end of the handle of the instrument;

Figure 6 is a side elevational view of the instrument shown in Figure 1;

Figure 7 is a rear elevational view of the instrument shown in Figure 1;

Figure 7A is a fragmentary rear elevational view of an instrument similar to Figure 7 showing the resistance measuring circuit within the instrument case and how the different resistance plugs for introducing different resistances for different temperatures are applied.

Figure 8 is a fragmentary longitudinal section through the handle of the instrument on substantially the line 8—8 of Figure 7;

Figure 9 is a wiring diagram of a temperature measuring instrument constructed according to the present invention;

Figures 10, 11 and 12 are side elevational views of three different resistance plugs for introducing different resistances for different temperature ranges;

Figure 13 is a wiring diagram of the fixed resistance for standardizing the instrument, showing the same in relation to the wiring diagram shown in Figure 9;

Figure 14 is a fragmentary detail section taken on the line 14—14 of Figure 8; and Figure 15 is a circuit diagram of the resistance plugs shown in Figures 10, 11, and 12.

Referring now to the drawing, it will be observed that the reference character 10 designates generally a measuring instrument, preferably of the D'Arsonval type which is provided with the conventional pointer 11 arranged to be operated by a moving coil relative to a scale 12 which is suitably calibrated to indicate temperature, as well known in the art. The instrument 10 has a case 13 removably fastened to an insulating base 14 to which is attached a handle 15 to permit holding the instrument by the hand of an operator, for use as will be presently described, and in position where the scale 12 is readily visible.

On the rear of the base 14 there are provided three terminal posts 16, 17, and 18 which it will be understood are connected to operate the moving coil within case 13 and thereby the pointer 11 relative to scale 12 when the instrument is connected to the temperature responsive element, or to the fixed resistance element (not temperature responsive), for standardizing the instrument. A flexible lead conductor 19 is secured at one end to the rear of base 14 by a bracket 20. The conductor 19 has triple wires 21, 22, and 23 connected to the posts 16, 17, and 18 and thereby in circuit with the instrument circuit. The opposite end of conductor 19 has a terminal connector 24 which comprises, for example, a metallic connector shell 25 having limited rotation on a metallic sleeve 26 within which is mounted an insulating plug 27 from the outer end of which project three terminal prongs 28, 29, and 30, one in circuit with each of the wires 21, 22, and 23.

The handle 15 is formed of metallic material, and positioned end to end in the tubular part of the handle—which is of cylindrical form—are a pair of dry batteries 31 and 32 of the flashlight type. The batteries 31 and 32 are clamped by a metallic end cap 33 endwise within the handle 15, with the central electrode 34 of the innermost battery in contact with a terminal contact 35, the central electrode 36 of the outermost battery in contact with the base of the cylindrical or cup-shaped outer electrode 37 of the innermost battery, and the base of the cylindrical or cup-shaped outer electrode 38 of the outermost battery in circuit with the end cap 33 through coiled spring 38' as shown. The batteries may, of course, be reversed, in which case the base of the cylindrical or cup-shaped outer electrode of the innermost battery will contact the terminal contact 35, whereas the base of the cylindrical or cup-shaped outer electrode of the outermost battery will contact the central electrode of the innermost battery, and the central electrode of the outermost battery will be in circuit with the end cap 33. A conductor 40 leads from the terminal contact 35 through the upper angular portion of the handle 15 which is attached to the rear of base 14 and into the instrument where it connects the batteries in circuit, as will presently appear.

Removably screwed at 42 into the end cap 33 is a metallic sleeve 43. Fixed within the enlarged outer end of the sleeve 43 is an insulating plug 44 having three openings, shown generally at 45, into which the terminal prongs 28, 29, and 30 of the terminal connector 24 are adapted to be inserted, and, when so inserted, contact terminal contacts shown diagrammatically at 46, 47, and 48 in Figure 13. The cap 33 is screwed at 50 into the adjacent end of the tubular handle 15.

The reference character 51 designates the fixed resistance which is not temperature responsive, and is adapted for standardizing the instrument. It is shown in Figure 8 carried by an insulating spool 52 and positioned within cap 33 when the connector sleeve 43 is applied thereto. Leads 53, 54 and 55 connect the resistance 51 in circuit with the terminal contacts 46, 47 and 48, the leads 53 and 54 extending from one end of resistance 51 to terminal contacts 46 and 47, respectively, and the lead 55 extending from the opposite end of resistance 51 to terminal contact 48, all as shown diagrammatically in Figure 13.

Referring to Figure 9, the measuring instrument is shown at 10, and the terminal contacts at the connector 24 are shown at 28, 29 and 30, one connected in circuit with each of the wires 21, 22 and 23 of the triple wire conductor 19. The negative terminal 58 of instrument 10 may be connected by a conductor 59 to one end of a calibrating resistance 60, as well known. The opposite end of resistance 60 is connected by a conductor 61 to a contact terminal 62, for example, of the socket type or of any other type.

The instrument is also provided with a Wheatstone bridge having the fixed resistances 63, 64 and 65, the junctions of the bridge being indicated at 66, 67, 68 and 69. The batteries 31, 32 are connected in series, as previously explained, with one terminal 34, for example, connected by the conductor 40 to the junction 67. The opposite terminal of batteries 31 and 32 is connected by conductor 22 through battery resistance 71 to terminal contact 29. The junction 69 is connected by conductor 21 to terminal contact 28, and a terminal contact 72 in proximity to junction 68 is connected by conductor 23 to terminal contact 30.

The Wheatstone bridge and instrument 10 constitute, in effect, a device for measuring resistance for the determination of the thermobulb temperature, the instrument being calibrated in terms of temperature.

For the purpose of recalibrating the instrument for different temperature ranges, I provide for adding resistance for higher temperatures. This may be accomplished, for example, by a plurality of resistance plugs, three of which are shown at 74, 75 and 76 in Figures 10, 11 and 12. Each plug 74, 75 and 76 has three terminal prongs 77, 78 and 79 adapted to be inserted into contact with terminal 62, junction 68, and terminal 72 to connect resistance portion 80 of the resistance plug, as shown diagrammatically in Figure 15, across terminal 62 and junction 68, and resistance portion 81 of the resistance plug, as shown in Figure 15, across junction 68 and terminal 72.

In Figure 7A the parts and instrumentalities which correspond to parts and instrumentalities shown in Figures 7 and 9 are indicated by primed reference characters corresponding to the reference characters used in Figures 7 and 9. The base 14' is shown provided with openings 120 into which the prongs 77, 78 and 79, for example, of the resistance plugs 74, 75 and 76 are adapted to be inserted and when so inserted contact the contact terminals 62, 68 and 72.

Although they may be of other resistances for other temperature ranges and additional resistance plugs may be provided, in the drawings the plug 74 is for temperatures from 0° to 100° F., whereas plug 75 is for temperatures from 100° to 200° F., and plug 76 is for temperatures from 200° to 300° F. The sockets for receiving the terminal prongs 77, 78 and 79 for contact with terminal 62, junction 68 and terminal 72 may be provided, for example, on the rear of base 14, or elsewhere as desired.

The temperature responsive element or thermobulb may be of any suitable or preferred form. In Figure 9, the thermobulb is shown in the form of a temperature responsive resistance element 85, one end of which is connected by a lead 86 to a terminal contact 87. The opposite end of the temperature responsive resistance element 85 is connected by leads 88 and 89 to terminal contacts 90 and 91. The terminal contacts 28, 29 and 30 are adapted for quick detachable connection, and contact with contacts 90, 91 and 87.

In Figure 2 the temperature responsive resistance element is sealed within a tube 93 which is provided with a flexible lead conductor 94 provided at its opposite end with a terminal connector 95 connected by triple wires to the temperature responsive element, as previously described. The connection device 96 to which the temperature responsive element is connected by the terminal connector 95 has a terminal connector 97 similar to the terminal connector at one end of the handle 15.

In order to test the battery voltage to standardize the instrument, the connector shell 25 is applied telescopically over the connector sleeve 43, as shown in dotted lines in Figure 1, the terminal prongs 28, 29 and 30 entering the openings 45 and into contact with terminal contacts 46, 47, and 48. Properly to locate the shell 25 relative to sleeve 43 in applying the shell to the sleeve, the shell has a longitudinally extending channel 100 (Figure 3) which enters only over a small nub or protuberance 101 pressed outwardly from the outer end of the sleeve 43.

Secured internally within the outer wall of channel 100 is a prong 103 (Figure 4) to one side of which nub 101 is adapted to pass in applying shell 25 over sleeve 43. Then after the nub 101 has passed the inner end of prong 103, the shell 25 is turned slightly relative to sleeve 43 to interlock the nub 101 behind the inner end of prong 103, thereby interlocking the shell 25 upon the sleeve 43. Limited rotation of shell 25 upon sleeve 43 is permitted by a circumferentially elongated slot 105 in shell 25, a screw 106 (Figure 1) being threaded into the sleeve 43 with its head engaging in slot 105 to limit rotation of shell 25 on sleeve 43.

After thus standardizing the instrument and with the thermobulb or temperature responsive resistance element 85 in position where it is subject to the temperature which it is desired to measure, the terminal connector 25, having been disconnected from the sleeve 43, is applied, for example, to the terminal connector 97 in precisely the same manner in which it is applied to the sleeve 43. This, in effect, places the terminal contacts 28, 29, and 30 in contact with the terminal contacts 90, 91, and 87 of the temperature responsive resistance 85, and the temperature is indicated by the position of the pointer 11 relative to the scale 12 of the instrument.

In testing or measuring temperatures at a plurality of stations or points with the instrument of the present invention, all that is required is to provide a temperature responsive unit or thermobulb for each such station or point, a quick detachable terminal connector for each temperature responsive resistance element, and a single portable resistance thermometer of the character described for quick detachable connection with the terminal connectors of the respective thermobulbs or temperature responsive resistance elements.

In the case of a closed compartment or space, such, for example, as a refrigerated car or truck, the temperature responsive resistance element may be properly located within the car, truck or other space, to obtain the desired temperature within such space or of products or commodities therein, with the terminal connector for the temperature responsive resistance element positioned, for example, in the wall of the car, truck or other space for application of the terminal connector 24 of the instrument thereto from the outside and without opening the door. In this way the temperatures at various stations or points may be accurately obtained with a minimum of fixed installation; also without complicated wiring and without selector switch mechanism and without separate triple wire connections extending from the indicator to each of the temperature responsive elements.

The arrangement of the batteries within the handle of the device provides a small, compact, and light weight portable instrument of the order of a flashlight, with the indicator 10 thereon. The arrangement of the standardizing resistance 51 in one end of the handle also makes for compactness and simplicity, and the ability of the terminal connector 24 to be plugged into and out of circuit selectively with either the standardizing resistance 51 or any of the plurality of temperature responsive resistances or thermobulbs 85 eliminates selector switches and the like, as well as the necessity for switching operations.

It is to be understood that a section of Manganin resistance (not shown) may be provided in the circuit of the instrument for compensation purposes, as known in the art; also that the form of thermobulb may vary widely, and that the terminal connector 24 of the instrument may be connected directly, for example, to a terminal connector on the end of the lead conductor for the thermobulb or temperature responsive resistance element, instead of through a connector device as shown at 96 in Figure 2.

An adjustable magnetic shunt 115 may be provided for adjustment, for example, by a thumb screw 116 for the purpose of adjusting for battery loss, as known in the art.

The embodiment of the invention shown in the drawings is for illustrative purposes only, and it is to be expressly understood that said drawings and the accompanying specification are not to be construed as a definition of the limits or scope of the invention, reference being had to the appended claims for that purpose.

I claim:

1. A portable resistance thermometer comprising, in combination, a tubular handle, an indicating instrument comprising an instrument case mounted on one end of said handle and having a resistance measuring circuit therein, a source of electric energy disposed within said tubular handle and connected in circuit with the resistance measuring circuit, a flexible lead conductor attached at one end to said instrument case and having a plurality of conductor wires leading from the attachment of the lead conductor into the instrument case and connected in circuit with the resistance measuring circuit within the case, a first plug-in connector mounted on the opposite end of said flexible lead conductor for connecting the resistance measuring circuit to an external temperature responsive resistance element, an end cap mounted on the opposite end of said handle, a fixed resistance non-responsive to temperature positioned within said end cap, and a second plug-in connector mounted on said end cap for connection with said first plug-in connector, said second plug-in connector having contacts connected in circuit with said fixed resistance.

2. A portable resistance thermometer according to claim 1 wherein there is a tubular connecting neck between the instrument case and the handle with the circuit connection between the source of electric energy and the resistance measuring circuit extending through said connecting neck.

3. A portable resistance thermometer according to claim 1 wherein the resistance measuring circuit within the instrument case comprises a Wheatstone bridge.

4. A portable resistance thermometer according to claim 1 wherein the resistance measuring circuit within the instrument case comprises a Wheatstone bridge circuit having gaps therein, and a resistance plug having a plug-in connector for connecting resistance portions of said plug across said gaps for adding resistance correlated to the temperature to be measured.

5. A portable resistance thermometer comprising, in combination, a tubular handle, an indicating instrument comprising an instrument case mounted on one end of said handle and having a resistance measuring circuit therein, a source of electric energy disposed within said tubular handle and connected in circuit with the resistance measuring circuit, a flexible lead conductor attached at one end to said instrument case and having a plurality of conductor wires leading from the attachment of the lead conductor into the instrument case and connected in circuit with the resistance measuring circuit within the case, a first plug-in connector mounted on the opposite end of first lead conductor, an end cap mounted on the opposite end of said handle, a fixed resistance non-responsive to temperature positioned within said end cap, a second plug-in connector mounted on said end cap for connection with said first plug-in connector, said second plug-in connector having contacts connected in circuit with said fixed resistance, and an external temperature responsive resistance having a plug-in connector corresponding to said second plug-in connector for connection to said first plug-in connector.

EMIL A. DE BRUYNE.

REFERENCES CITED

The following references are of record in the file of this patent:

UNITED STATES PATENTS

| Number | Name | Date |
|---|---|---|
| 1,231,045 | Means | June 26, 1917 |
| 1,323,824 | Brueckner | Dec. 2, 1919 |
| 1,444,771 | Baker | Feb. 13, 1923 |
| 1,978,440 | Shepard | Oct. 30, 1934 |
| 2,016,660 | Weeks | Oct. 8, 1935 |
| 2,098,650 | Stein | Nov. 9, 1937 |
| 2,297,868 | Bergeron | Oct. 6, 1942 |
| 2,457,751 | Thompson | Dec. 28, 1948 |